No. 866,693. PATENTED SEPT. 24, 1907.
J. F. SOUTHERN & H. J. GRIEST.
ROTARY EXPLOSION ENGINE.
APPLICATION FILED APR. 27, 1904.

6 SHEETS—SHEET 1.

WITNESSES:
R. J. Snyder
John Dolman Jr.

INVENTORS
John F. Southern
Henry J. Griest
BY
John Dolman
ATTORNEY.

No. 866,693. PATENTED SEPT. 24, 1907.
J. F. SOUTHERN & H. J. GRIEST.
ROTARY EXPLOSION ENGINE.
APPLICATION FILED APR. 27, 1904.

6 SHEETS—SHEET 2.

WITNESSES:

INVENTORS
John F. Southern
Henry J. Griest
BY
John Dolman
ATTORNEY.

No. 866,693. PATENTED SEPT. 24, 1907.
J. F. SOUTHERN & H. J. GRIEST.
ROTARY EXPLOSION ENGINE.
APPLICATION FILED APR. 27, 1904.

6 SHEETS—SHEET 3.

WITNESSES:

INVENTORS
John F. Southern
Henry J. Griest
BY
John Dolman
ATTORNEY.

No. 866,693. PATENTED SEPT. 24, 1907.
J. F. SOUTHERN & H. J. GRIEST.
ROTARY EXPLOSION ENGINE.
APPLICATION FILED APR. 27, 1904.

6 SHEETS—SHEET 4.

WITNESSES:
R. A. Snyder
John Dolman Jr.

INVENTORS
John F. Southern
Henry J. Griest
by John Dolman
attys

No. 866,693.
PATENTED SEPT. 24, 1907.
J. F. SOUTHERN & H. J. GRIEST.
ROTARY EXPLOSION ENGINE.
APPLICATION FILED APR. 27, 1904.

6 SHEETS—SHEET 5.

WITNESSES:
R. C. Snyder
John Dolman Jr.

INVENTORS
John F. Southern
Henry J. Griest
BY John Dolman
ATTORNEY.

No. 866,693. PATENTED SEPT. 24, 1907.
J. F. SOUTHERN & H. J. GRIEST.
ROTARY EXPLOSION ENGINE.
APPLICATION FILED APR. 27, 1904.
6 SHEETS—SHEET 6.
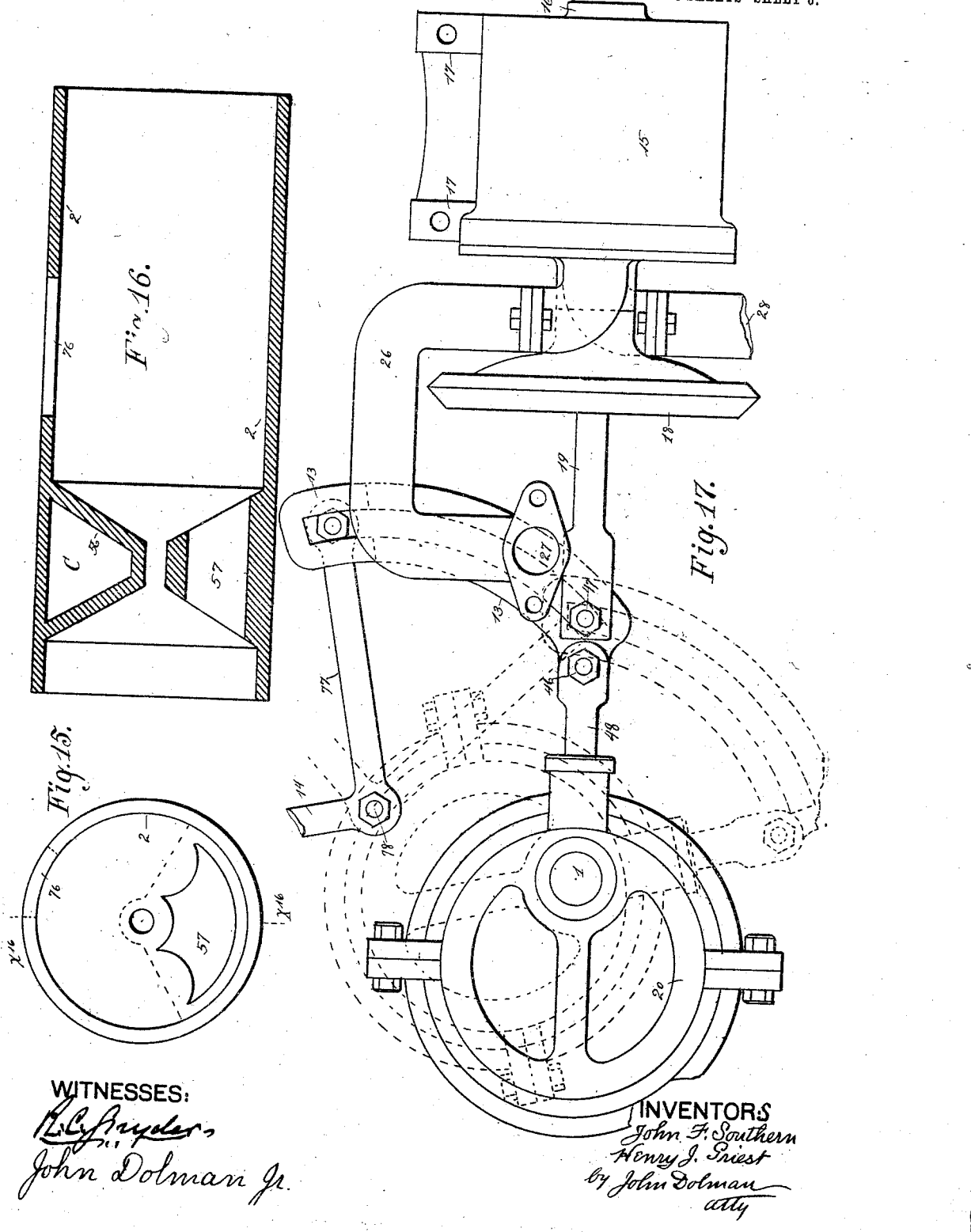
WITNESSES:
INVENTORS
John F. Southern
Henry J. Griest
by John Dolman
atty

UNITED STATES PATENT OFFICE.

JOHN F. SOUTHERN, OF WILMINGTON, DELAWARE, AND HENRY J. GRIEST, OF CHESTER, PENNSYLVANIA; SAID SOUTHERN ASSIGNOR TO SAID GRIEST.

ROTARY EXPLOSION-ENGINE.

No. 866,693.      Specification of Letters Patent.      Patented Sept. 24, 1907.

Application filed April 27, 1904. Serial No. 205,111.

*To all whom it may concern:*

Be it known that we, JOHN F. SOUTHERN and HENRY J. GRIEST, citizens of the United States, and residing, respectively, at Wilmington, in the county of New Castle and State of Delaware, and at Chester, in the county of Delaware and State of Pennsylvania, have invented a new and useful Rotary Explosion-Engine, of which the following is a specification.

Our invention relates to the type of rotary explosion engines in which the piston revolves through an annular cylinder, receiving a fresh impulse from the exploding gases at each revolution. The nature of our invention will appear from the description and claims following, taken in connection with the drawings forming part of this specification.

Figure 1:
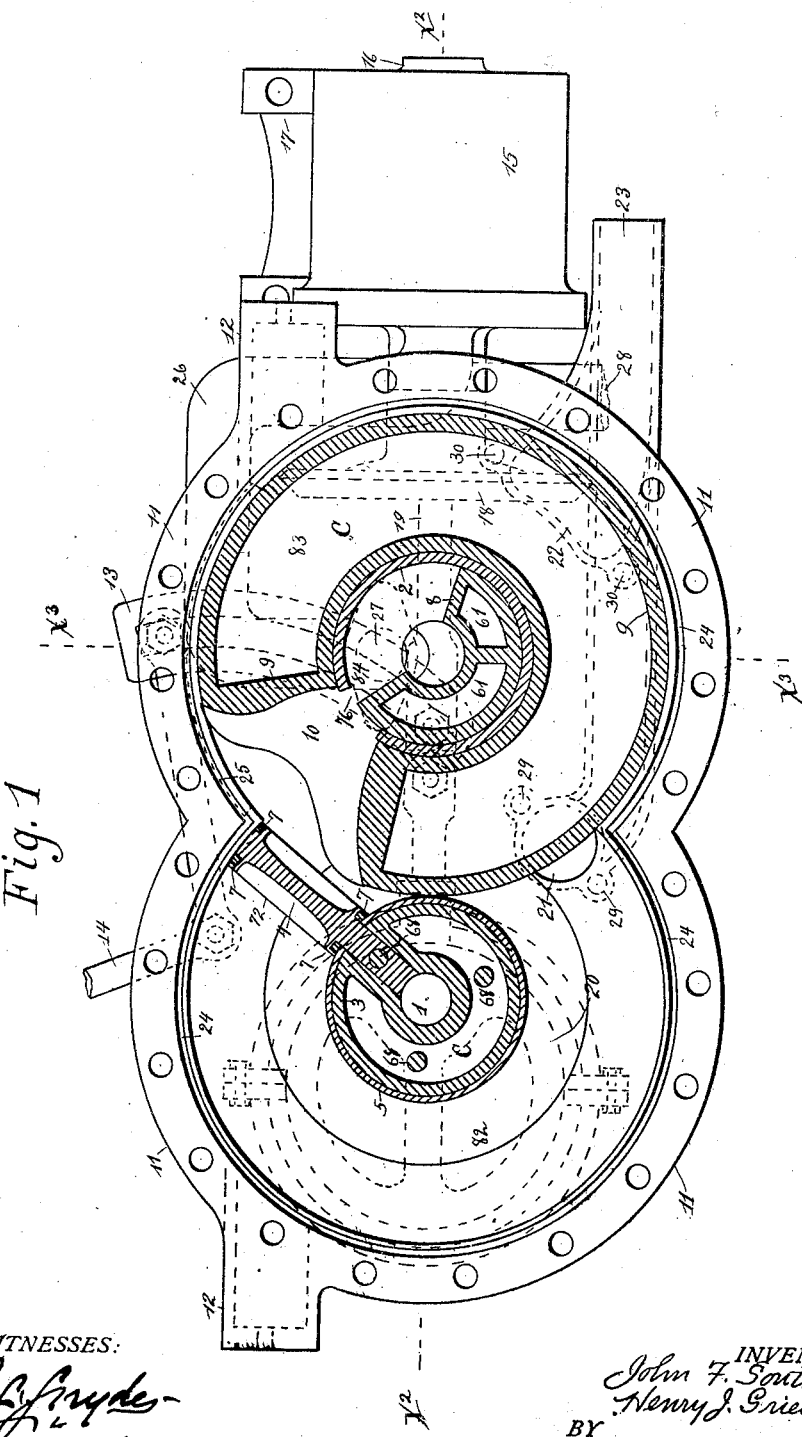
Figure 2:
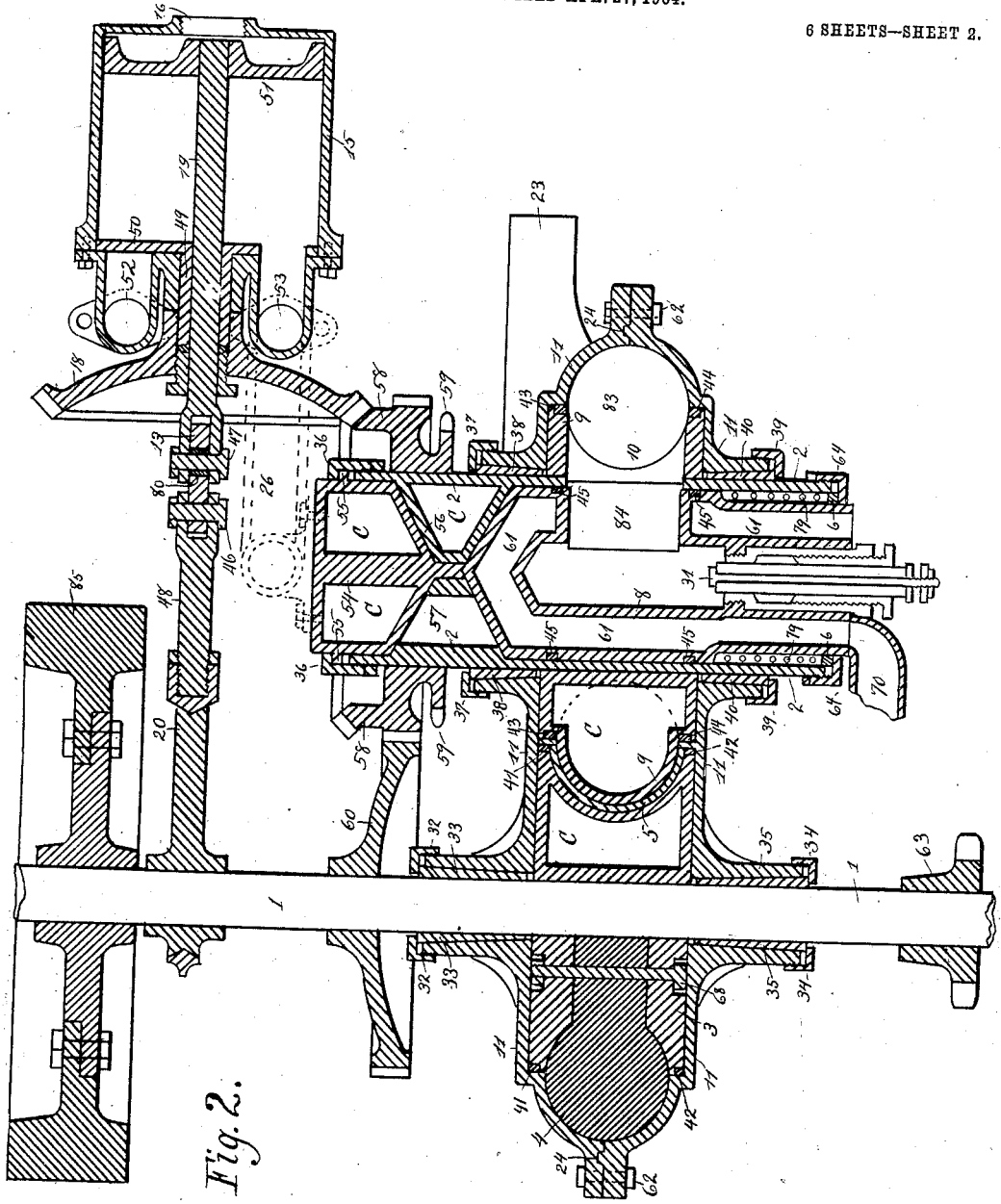
Figure 3:
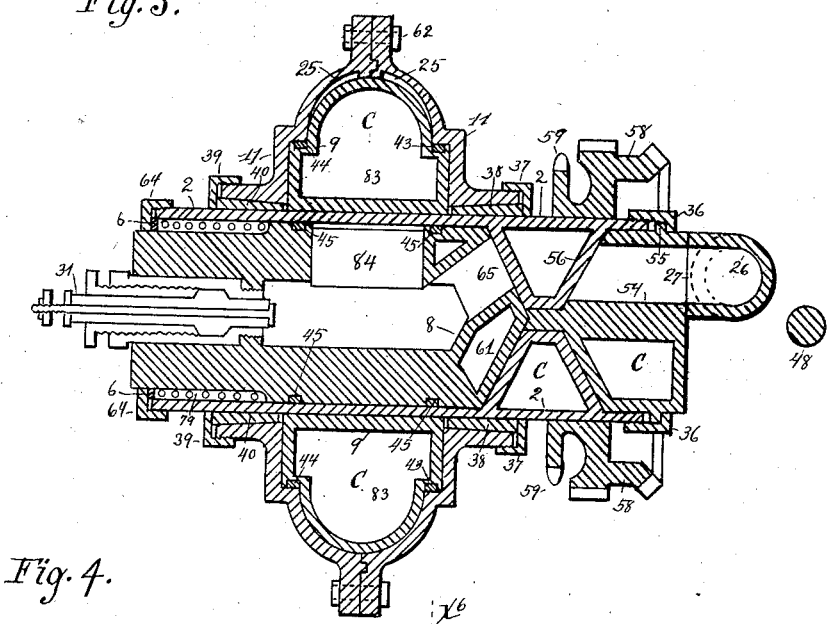
Figure 4:
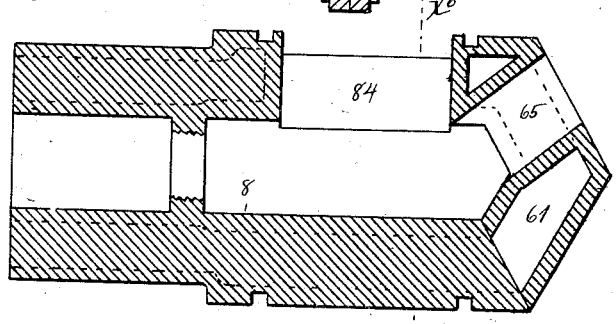
Figure 5:
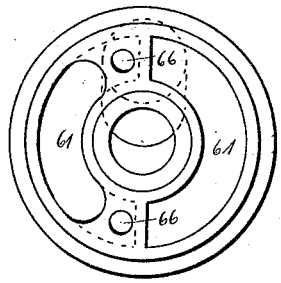
Figure 6:
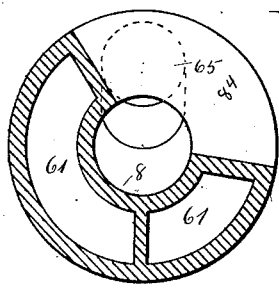
Figure 7:
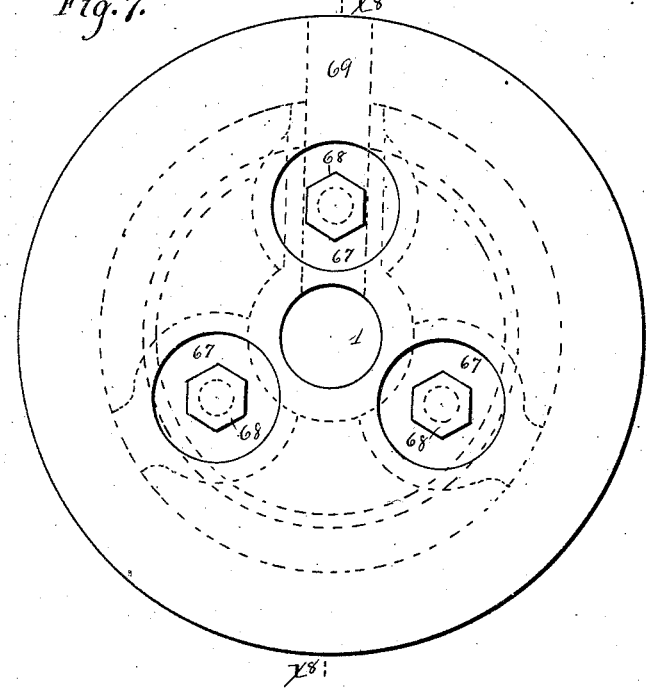
Figure 8:
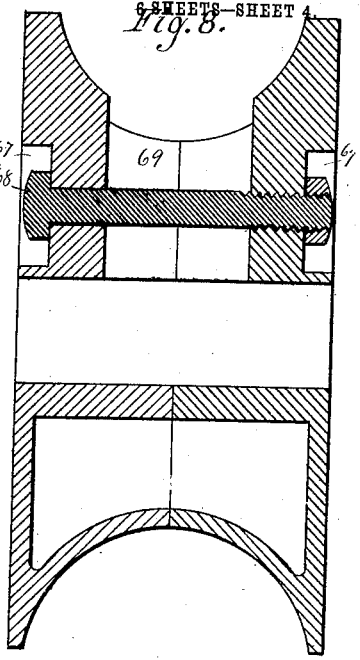
Figure 9:
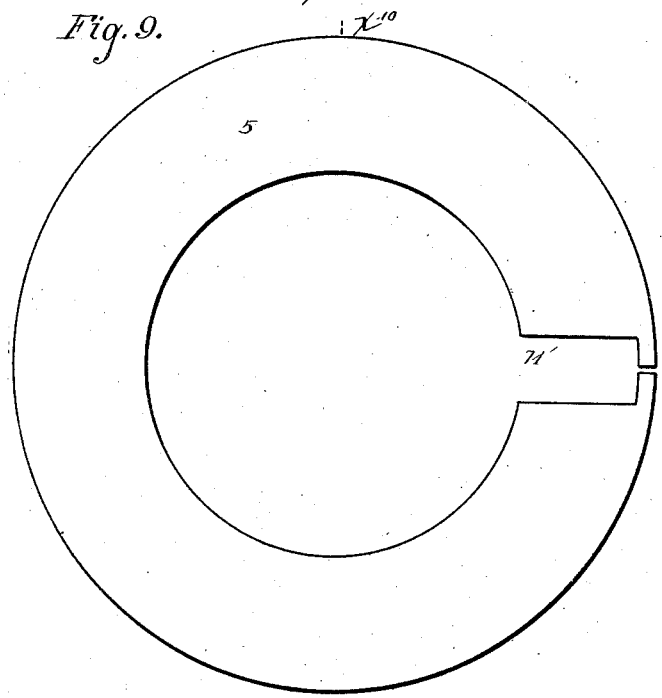
Figure 10:
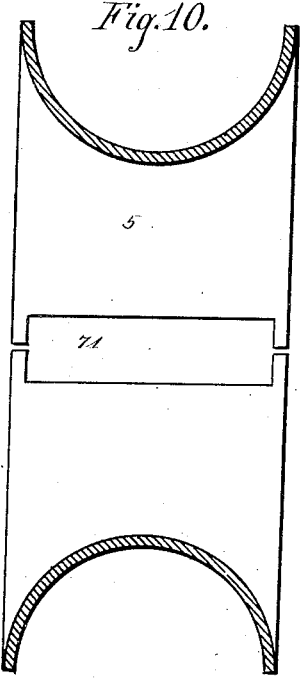
Figure 11:
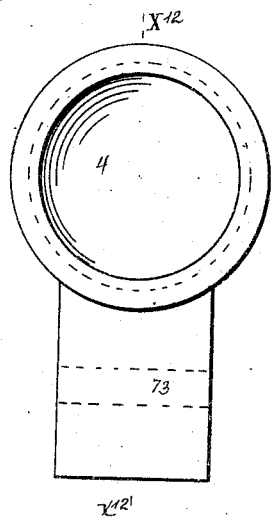
Figure 12:
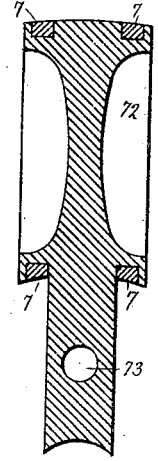
Figure 13:
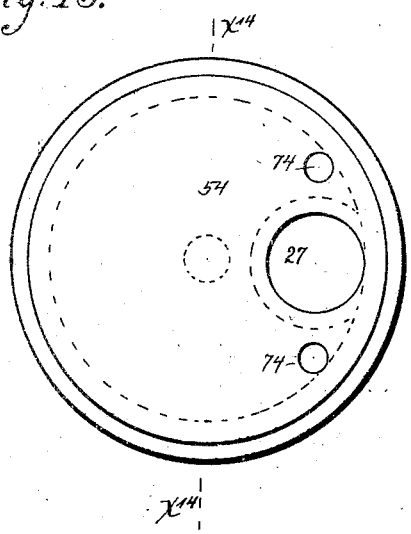
Figure 14:
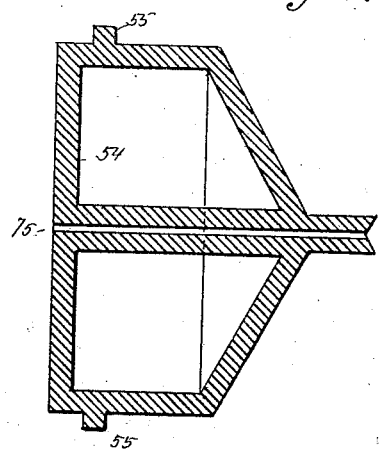

Referring to the drawings, Figure 1 is a vertical longitudinal section of our engine. Fig. 2 is a sectional plan view taken on line $X^2$ of Fig. 1; Fig. 3 is a sectional view taken on line $X^3$ of Fig. 1; Fig. 4 is a sectional view of the explosion chamber on a somewhat larger scale; Fig. 5 is an end view of Fig. 4; Fig. 6 is a sectional view of Fig. 4 on line $X^6$. Fig. 7 is a side view of the piston holder on a still larger scale; Fig. 8 is a sectional view on line $X^8$ of Fig. 7; Fig. 9 is a side view of the expansion ring surrounding the piston holder; Fig. 10 is a sectional view of Fig. 9 on line $X^{10}$; Fig. 11 is a view of the piston; Fig. 12 is a sectional view of Fig. 11 on line $X^{12}$; Fig. 13 is an end view of the plug; Fig. 14 is a sectional view of Fig. 13 on line $X^{14}$; Fig. 15 is an end view of the abutment shaft; Fig. 16 is a sectional view of Fig. 15 on line $X^{16}$; and Fig. 17 is a diagrammatic view of the pump and its connections.

The main shaft, 1, runs in bearings in the case, 11, these bearings being provided with adjusting cones 33 and 35 held in place by the screw caps 32 and 34. The case is formed in two similar halves to admit the working parts and bolted together at 62 after the working parts are in place; it is made tight by annular tongues and grooves 24.

Fitting inside the case, 11 and keyed, or otherwise firmly secured to the main shaft, 1, is the piston holder, 3, it is provided with expansion rings, 41 and 42 to prevent leakage, and the piston, 4 is secured in it by means of the bolt, 68, passing through bolt hole, 73. The piston, 4, is provided with expansion rings, 7, and is dished out at 72, for the purpose of increasing the expansion space. Surrounding the piston holder, 3, is a semicylindrical expansion ring, 5, cut out at, 71, to allow the insertion of the piston; this expansion ring is for the purpose of preventing leakage between the piston holder and the abutment, it also prevents leakage from one side of the cylinder 82 to the other side between the two portions of the piston holder, 3.

The piston holder, 3, is provided with the recesses, 67, (see Figs. 7 and 8,) to accommodate the heads of the bolts, 68. It is preferably formed in two portions and bolted together, forming a socket, 69, for the reception of the piston, 4. The piston holder is of a concave semicircular section, as shown, and this concave portion together with the concave inside of the case, form what we term the piston cylinder, 82. And by the term "piston cylinder" we refer to the chamber in which the piston head, 4 moves and which in this case is in the form of a cylindrical ring and is properly termed an annular cylinder as distinguished from a right cylinder as in an ordinary reciprocating engine.

Keyed or otherwise firmly secured to the abutment shaft, 2, is the abutment, 9, the convex surface of which fits into the concave surface of the expansion ring, 5. This abutment, 9, is provided with an opening or recess, 10, to allow the passage of the piston through it; this opening is of a peculiar shape, as shown, which we have found is the correct shape to just allow the passage of the piston without substantially any waste space. It will be noticed in the sectional view of Fig. 1, that the two sides of the opening, 10 are not exactly of the same shape, as they would be if this opening only just allowed the piston to pass, but we have thought it advisable to remove the hump from one side of the opening 10, in order to give a fully open, straight passage for the expanding gases to impinge upon the piston. Also keyed, or otherwise firmly secured to the abutment shaft, 2, is a gear, 58, meshing with the gear, 60, on shaft, 1, thus causing the two shafts to rotate synchronously. The concave portion of the case in which the abutment rotates, we term the abutment cylinder, 83. And by the term "abutment cylinder" we refer to the chamber in which the abutment moves or rotates which in this case is in the form of a cylindrical ring and is properly termed an annular cylinder.

Within the shaft, 2, and forming part thereof, is an annular wall or flange, 56, of a V shaped cross section as shown, it is provided with an opening 57 of the shape shown clearly in Fig. 15. Also within the abutment shaft, 2, but not forming part thereof, is the explosion chamber, 8, (see Figs. 2, 4, 5 and 6) it has an opening, 65, and its end is conical in shape to fit closely against the flange, 56. On the opposite side of the said flange, 56, and within the abutment shaft, 2, is a plug, 54, which also is of a conical shape on the end to fit closely against the flange 56; it is provided with an annular flange 55, by means of which, in connection with the screw cap, 36, it is held in place in the abutment shaft, 2. This plug, 54, is also provided with an opening 27, directly in line with the opening 65 of the explosion chamber.

By the rotation of the abutment shaft, 2, the plug and explosion chamber remaining stationary, the opening 57 in the flange 56, may be brought in line with the openings 27 and 65, thus making a continuous port into the explosion chamber. An oil hole, 75, shown in Fig. 14, is provided for oiling the parts.

The explosion chamber is cored out at 61 to admit the passage of air, water or other cooling medium, and a pipe, 70 is bolted to the end thereof, at the bolt holes, 66, for the entry of the cooling medium. A spark plug, 31, of any approved construction is screwed into the end of the explosion chamber as shown. Surrounding the end of the explosion chamber at the outer end, is a spiral spring, 79, held in place by the washer, 6, and screw cap, 64, which together hold the explosion chamber in a yielding but tight joint against the flange, 56. The abutment shaft, 2, is provided with bearings in the case, 11, having adjusting cones 38 and 40 and screw caps 37 and 39. The explosion chamber is provided also with the expansion rings, 45, and the abutment is provided with the expansion rings 43 and 44 to prevent leakage.

An eccentric, 20, on the main shaft, 1, through the connecting rod 48, operates the pump, 15. The length of the stroke of the pump piston 51, is adjustable by means of the link motion, 13. To the link, 13, the connecting rod, 48, is pivoted at 46, and the piston rod, 19 is pivoted to the sliding block, 80. An L shaped lever, 77 is centered at 78, and pivoted to the link, 13 at 81. By means of this lever, the link, 13, may be thrown down, together with the connecting rod, 48, bringing the eccentric to the position shown by dotted lines in Fig. 17, or any position intermediate between that and the position shown in full lines in the same figure. The further down the link is thrown the shorter will be the stroke of the pump piston until the position shown in dotted lines is reached, when the pump piston will not work at all.

From any suitable carbureter or mixing chamber, (not shown) the pipe, 28, leads into the pump, 15, through the port, 52. Surrounding the piston rod, 19, is a gear, 18, meshing with gear, 58. This gear, 18, is keyed or otherwise firmly secured to a sleeve, 49, which forms part of or is firmly secured to the valve, 50, said valve being a flat disk provided with an opening, preferably of a similar shape to the opening 57 shown in Fig. 15 which by its rotation will come into line alternately with the ports 52 and 53.

Through the port 53 the explosive mixture passes through the pipe 26 to the opening, 27, in the plug, 54. The pipe, 26 is bolted to the plug 54, through the bolt holes, 74. A boss, 16, is provided in the end of the pump, to which, if desired, a pipe may be attached, not shown in the drawings, and the other end of such pipe attached to the pipe 70 and air pumped through the core, 61, of the explosion chamber, for cooling the same. Of course a suitable valve would be required as would be well known to any mechanic.

The discharge or exhaust port, 21, of the piston cylinder, is bolted to the case at 29, and the exhaust port, 22, of the abutment cylinder is bolted to the case at 30. These ports are always open and discharge together at 23.

A channel, 25, is formed in the case, (see Figs. 1 and 3,) extending for the distance shown in dotted lines in Fig. 1, which permits the passage of the exploded gases past the abutment during a portion of the rotation of the same.

The case is provided with lugs, 12, and the pump with lugs, 17 for attaching the same to the frame of a vehicle, or a base or in any position where it is desired to use the engine. A sprocket wheel, 63, on the main shaft, and a sprocket wheel, 59, on the abutment shaft, are shown for the purpose of running the machinery or other thing to be driven, by means of chains; belt pulleys may be used instead of the sprockets, or a boat screw or other machinery may be run directly from either shaft, or the engine may, of course, be used in any way desired. A fly wheel is shown at, 85, but it may, of course be placed at any convenient point.

The various portions of the drawings marked, C, represent spaces cored out simply to save material and reduce weight.

The operation of our engine is as follows: Starting with it in the position shown in Fig. 1, the pump valve, 50, is in such a position that the port, 52, is open. The motion of the eccentric, 20, pushes in the piston, 51, drawing the mixed gases from the mixing chamber or carbureter through port, 52, into the pump; by this time the rotation of the gear, 18, and valve, 50, has closed the port, 52, and opened the port, 53, to the position shown in Fig. 2. The continued rotation of the eccentric, now draws out the piston, 51, forcing the mixed gases through port, 53 and pipe, 26, and opening, 27, in plug, 54; the rotation of the abutment shaft, 2, has, in the mean time, brought the opening, 57, in the flange, 56, in line with the opening, 27, so that the mixed gases are forced through, 57, and through opening 65, and compressed in the explosion chamber, 8. The continued rotation of the engine will now have closed openings 53, and, 57, and brought the parts nearly to the position shown in Fig. 1, but, before the rotation of the abutment shaft, 2, has opened the outlet, 84, of the explosion chamber, a spark is given by the spark plug, 31, igniting the gases while the explosion chamber is still closed. After the gases are ignited, the parts of the engine come into the position shown in Fig. 1, where the rotation of the abutment shaft 2, has brought the opening, 76, into conjunction with the outlet, 84, of the explosion chamber, allowing the exploded gases to expand through the opening, 10, in the abutment into the piston cylinder, 82 and against the piston, 4, forcing the same around and continuing the rotation of the engine. The air or gases in front of the piston passing out through the open exhaust port, 21.

The channel, 25, is provided as a passage way for the exploded gases, allowing them to pass around the abutment to the piston cylinder and to act upon the piston, 4, until it has completed fully half its revolution, and the expansion of the gases in the piston cylinder still exerting a force on the piston until it has reached the exhaust port 21. The abutment closes this channel, 25, just before it opens into the discharge port, 22, and it opens into the exhaust port, 22, before the rotation of the abutment shaft, 2 has closed the explosion chamber, so that there shall for an instant be a free opening from the explosion chamber out through the exhaust port, 22 to allow the dead gases to escape. The explosion chamber is closed by the abutment shaft, 2 just before the port, 53, from the pump opens to refill it with the explosive mixture.

By means of the link motion, 13, before described, the length of the stroke of the pump piston, 51, may be adjusted, thus regulating the amount of gases exploded at each revolution of the engine, and consequently regulating the speed of the engine.

The plug, 54, and explosion chamber, 61, in connection with the flange, 56, form a valve of a novel character possessing peculiar and valuable features. It will be noted that this valve is continually grinding in its seat, evenly and always toward the center, and will consequently always remain tight. The peculiar form of the opening, 57, also adds a valuable feature in that it causes the valve to open and close as quickly as possible with a uniform motion, or, in other words, it passes the largest possible amount of gases in a given time.

The forming of both the piston holder and the abutment of a semicircular section to fit one another, we consider a feature of importance. In the first place, the piston should be circular so that it may conveniently be made tight by the use of the expansion rings, 7, it being impracticable to fit an angular piston with expansion rings. These expansion rings, 7, will expand to some degree when the piston enters the recess, 10, in the abutment; and if this abutment were of rectangular section, its junction with the piston cylinder, 82, would form a shoulder, against which the expansion rings 7 would knock when reëntering the piston cylinder from the recess, 10, at every revolution. By making the abutment, however, as shown, we avoid this difficulty; for the piston cylinder, 82, and the abutment cylinder, 83, are practically two equal intersecting cylindrical rings, and, it will be seen, they form no such shoulder at their junction, but the piston when leaving the recess, 10 will gradually enter the piston cylinder and the expansion rings, 7, will be gradually compressed. This semicircular section of the two cylinders also renders it easier to prevent leakage past the point of contact between the piston holder and the abutment and past the piston; there is also an advantage in construction as both ends of each side of the case may be turned out by the same tool.

While we have specifically described what appears to us to be the very best means of accomplishing the desired result, we would have it understood that we do not limit ourselves to the exact details of construction shown, but reserve the right to make such slight changes and alterations as may suggest themselves from time to time without departing from the spirit of this invention or affecting the operations thereof.

Having therefore fully described our invention and the best mode known to us of constructing and operating the same, what we claim and desire to secure by Letters Patent, is,—

1. In a rotary explosion engine, a revolving piston, an annular cylinder in which the piston revolves, a piston carrier concentric with the annular cylinder and with a semicircular concave cross section, intersecting the annular cylinder and fitting the concavity of the piston holder, and an opening in the abutment to permit the passage of the piston, substantially as shown and described.

2. In a rotary engine, a case, a main shaft having bearings in the case, a piston holder of concave semicircular cross section secured to the main shaft inside the case, an annular piston cylinder formed of the case and the piston holder, a piston carried by the piston holder and adapted to revolve in the piston cylinder, a hollow abutment shaft having bearings in the case, gearing connecting the main shaft with the abutment shaft, an abutment of convex semicircular cross section secured to the abutment shaft inside the case intersecting the piston cylinder and fitting the concavity of the piston holder, an opening in the abutment to permit the passage of the piston and the entry of the actuating fluid, an opening in the abutment shaft joining the opening in the abutment making a passage from the abutment shaft through the abutment, an explosion chamber inside the abutment shaft arranged to discharge at the proper time through the abutment into the piston cylinder, means for exploding gases inside the explosion chamber at proper times, and a valve controlling the admission of gases into the explosion chamber.

3. In a rotary engine, a piston carrier, forming with the case an annular piston cylinder, a piston carried by the piston carrier an abutment intersecting the piston cylinder, an opening in the abutment to permit the passage of the piston and admit the actuating fluid, and a channel in the case permitting the passage of the actuating fluid past the abutment.

4. The combination of the plug, 54 and explosion chamber, 8, each having a pyramidal surface with an opening through the same, a hollow shaft surrounding the plug and explosion chamber, an annular flange of V shaped cross section, forming part of the hollow shaft and extending between and in contact with the pyramidal surfaces of the plug and explosion chamber, an opening through the flange capable of being brought into conjunction with the openings through the plug and explosion chamber by the rotation of the hollow shaft, and means for rotating the hollow shaft.

5. The combination of a piston holder of concave semicircular cross section, a piston carried by said holder, and an expansion ring of semicircular cross section adapted to fit around the piston holder and cut out to admit the piston, substantially as shown and described.

6. In a rotary engine, a revolving piston, an annular cylinder in which the piston revolves, an annular abutment intersecting and closing the annular cylinder and having an opening to permit the passage of the piston, means for securing synchronism in the rotation of the piston and abutment, a hollow shaft on which the abutment is fixed and on which it rotates having an opening coinciding with the opening in the abutment, an explosion chamber inside the hollow shaft and having an opening therein arranged to coincide at predetermined intervals with the opening through the hollow shaft and abutment, and means for discharging gases in the explosion chamber at predetermined intervals as shown and described.

In testimony whereof we have signed our names to this specification in the presence of two subscribing witnesses.

JOHN F. SOUTHERN.
HENRY J. GRIEST.

Witnesses:
S. H. LINAWEAVER,
DAVID KELSO.